US008369306B2

(12) United States Patent
Jung et al.

(10) Patent No.: US 8,369,306 B2
(45) Date of Patent: Feb. 5, 2013

(54) METHOD FOR TRANSMITTING AND RECEIVING DATA IN A MOBILE COMMUNICATION SYSTEM

(75) Inventors: Young-Ho Jung, Suwon-si (KR); Cheol-Woo You, Seoul (KR); Yung-Soo Kim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 871 days.

(21) Appl. No.: 11/940,519

(22) Filed: Nov. 15, 2007

(65) Prior Publication Data

US 2008/0113684 A1 May 15, 2008

(30) Foreign Application Priority Data

Nov. 15, 2006 (KR) .................. 10-2006-0112792

(51) Int. Cl.
*H04L 12/56* (2006.01)
*H04J 1/16* (2006.01)

(52) U.S. Cl. ........ 370/348; 370/252; 370/329; 370/458; 370/468

(58) Field of Classification Search .................. 370/342, 370/328, 329, 252, 348, 458, 468; 455/450
See application file for complete search history.

(56) References Cited

U.S. PATENT DOCUMENTS

| 6,130,886 | A | 10/2000 | Ketseoglou et al. | |
|---|---|---|---|---|
| 6,347,091 | B1 * | 2/2002 | Wallentin et al. | ............. 370/437 |
| 6,650,714 | B2 | 11/2003 | Dogan et al. | |
| 2004/0033807 | A1 * | 2/2004 | Cave | .............................. 455/450 |
| 2004/0037238 | A1 * | 2/2004 | Schiff et al. | .................... 370/321 |
| 2004/0198345 | A1 * | 10/2004 | Farber et al. | ............... 455/426.1 |
| 2005/0009529 | A1 * | 1/2005 | Chen et al. | ...................... 455/450 |
| 2006/0018279 | A1 * | 1/2006 | Agrawal et al. | ............... 370/330 |
| 2006/0105772 | A1 * | 5/2006 | Khawand et al. | ............. 455/450 |
| 2006/0140257 | A1 * | 6/2006 | Liu | ............... 375/148 |
| 2006/0142021 | A1 | 6/2006 | Mueckenheim et al. | |
| 2007/0133494 | A1 * | 6/2007 | Lai et al. | ........................ 370/342 |
| 2007/0253362 | A1 * | 11/2007 | Wang et al. | .................... 370/329 |
| 2008/0182582 | A1 * | 7/2008 | Bachl et al. | ................... 455/446 |
| 2009/0070650 | A1 * | 3/2009 | Bourlas et al. | ................ 714/748 |
| 2009/0073920 | A1 | 3/2009 | Goldhamer | |

FOREIGN PATENT DOCUMENTS

| KR | 1020010034910 | 4/2001 |
|---|---|---|
| KR | 1020050072426 | 7/2005 |
| WO | WO 02/13546 | 2/2002 |
| WO | WO 2005/122616 | 12/2005 |
| WO | WO 2006/048873 | 5/2006 |

* cited by examiner

*Primary Examiner* — John Pezzlo
(74) *Attorney, Agent, or Firm* — The Farrell Law Firm, P.C.

(57) ABSTRACT

A method for transmitting and receiving data in a communication system. The method generates a frame for mapping each of multiple communication service modes of a base station providing the multiple communication service modes to a user terminal, in units of subframes each having a time interval and a frequency band. The method includes estimating a communication service mode supporting an optimal service among the multiple communication service modes provided by the base station supporting the multiple communication service modes, and sending to the base station a random access message for access to the base station over a shared channel.

16 Claims, 11 Drawing Sheets

METHOD FOR TRANSMITTING AND RECEIVING DATA IN A MOBILE COMMUNICATION SYSTEM

PRIORITY

This application claims priority under 35 U.S.C. §119(a) to a Korean Patent Application filed in the Korean Intellectual Property Office on Nov. 15, 2006 and assigned Serial No. 2006-112792, the contents of which are incorporated herein by reference.

BACKGROUND OF THE INVENTION

1. Field of the Invention

The present invention relates generally to a communication system, and in particular, to a method for transmitting and receiving data using a random access technology in a communication system supporting multiple communication service modes.

2. Description of the Related Art

The conventional single-Radio Access Technology (RAT) communication system provides only one communication service mode specialized in each environment, and has a base station(s) supporting a corresponding communication service mode using a single RAT. The single-RAT communication system can support a communication service mode such as Wireless Local Area Network (WLAN), $2^{nd}$ Generation Code Division Multiple Access (CDMA), Wireless Broadband Internet (WiBro) and W-CDMA.

With the rapid development of communication technology, new communication service modes are being commercialized in the environment where existing communication services are provided. In particular, a single-RAT communication system supporting multiple communication service modes is positively considered as the post-$3^{rd}$ Generation (3G) mobile communication system. For example, when two types of communication service modes optimized for the mobile environment and the stationary environment, respectively, are adaptively serviced according to the channel environment of users, they can provide superior communication performance, compared to the communication system that is optimized for any one of the channel environments or for a compromised environment of the two channel environments.

The conventional single-RAT communication system supporting a single communication service mode has one random access channel over which a user can make an access request in the cell, and all users make an access attempt using the random access channel.

However, the random access method in the conventional single-RAT communication system cannot be applied to the communication system that adaptively distributes the shared time-frequency-space resources using the radio access technology optimized for multiple communication service modes.

Therefore, there is a need for random access technologies for providing an optimal service to a user terminal in the communication system where multiple communication service modes are provided.

SUMMARY OF THE INVENTION

An aspect of the present invention is to address at least the problems and/or disadvantages in the prior art and to provide at least the advantages described below. Accordingly, an aspect of the present invention is to provide a random access method in a communication system supporting multiple communication service modes.

According to the present invention, there is provided a method for transmitting and receiving data by a user terminal in a communication system. The method includes estimating a communication service mode supporting an optimal service among multiple communication service modes provided by a base station supporting the multiple communication service modes, and sending a random access message to the base station for, access thereto over a shared channel.

According to the present invention, there is provided a method for transmitting and receiving data by a user terminal in a communication system. The method includes estimating a communication service mode supporting an optimal service among multiple communication service modes provided by a base station supporting the multiple communication service modes, and sending a random access message to the base station for access thereto over a dedicated channel for the estimated communication service mode.

According to the present invention, there is provided a method for transmitting and receiving data by a user terminal in a communication system. The method includes estimating a communication service mode supporting an optimal service among multiple communication service modes provided by a base station supporting the multiple communication service modes, and determining whether a dedicated channel of the communication service mode supporting the optimal service is scheduled. If the dedicated channel is scheduled, a random access message is sent to the base station for access thereto over the dedicated channel. If no dedicated channel is scheduled, a random access message is sent to the base station for access thereto over a shared channel.

According to the present invention, there is provided a method for transmitting and receiving data in a communication system. The method includes generating a frame for mapping each of multiple communication service modes of a base station providing the multiple communication service modes to a user terminal, in units of subframes each having a time interval and a frequency band.

According to the present invention, there is provided a method for transmitting and receiving data by a base station in a communication system. The method includes transmitting a reference signal indicative of its own identifier to a user terminal, receiving a communication service mode supporting an optimal service, estimated from the user terminal, among multiple communication service modes supported by the base station, receiving a random access message from the user terminal over a shared channel, adjusting a resource allocation ratio for each individual communication service mode according to the received random access message, and then scheduling an uplink/downlink channel to the user terminal.

According to the present invention, there is provided a method for transmitting and receiving data by a base station in a communication system. The method includes transmitting a reference signal indicative of its own identifier to a user terminal, receiving a random access message over a dedicated channel scheduled for an optimal communication service mode estimated from the user terminal among multiple communication service modes supported by the base station, adjusting a resource allocation ratio for each individual communication service mode according to the random access message, and scheduling an uplink/downlink channel to the user terminal.

According to the present invention, there is provided a method for transmitting and receiving data by a base station in a communication system. The method includes transmitting a reference signal indicative of its own identifier to a user terminal, and determining whether a dedicated channel allocated for an optimal communication service mode estimated from the user terminal among multiple communication service modes supported by the base station is scheduled. If a dedicated channel is scheduled, a random access message is received from the user terminal over the scheduled dedicated channel, and if no dedicated channel is scheduled, the random access message is received over a shared channel. The method further includes adjusting a resource allocation ratio for each individual communication service mode according to the random access message, and scheduling an uplink/downlink channel to the user terminal.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
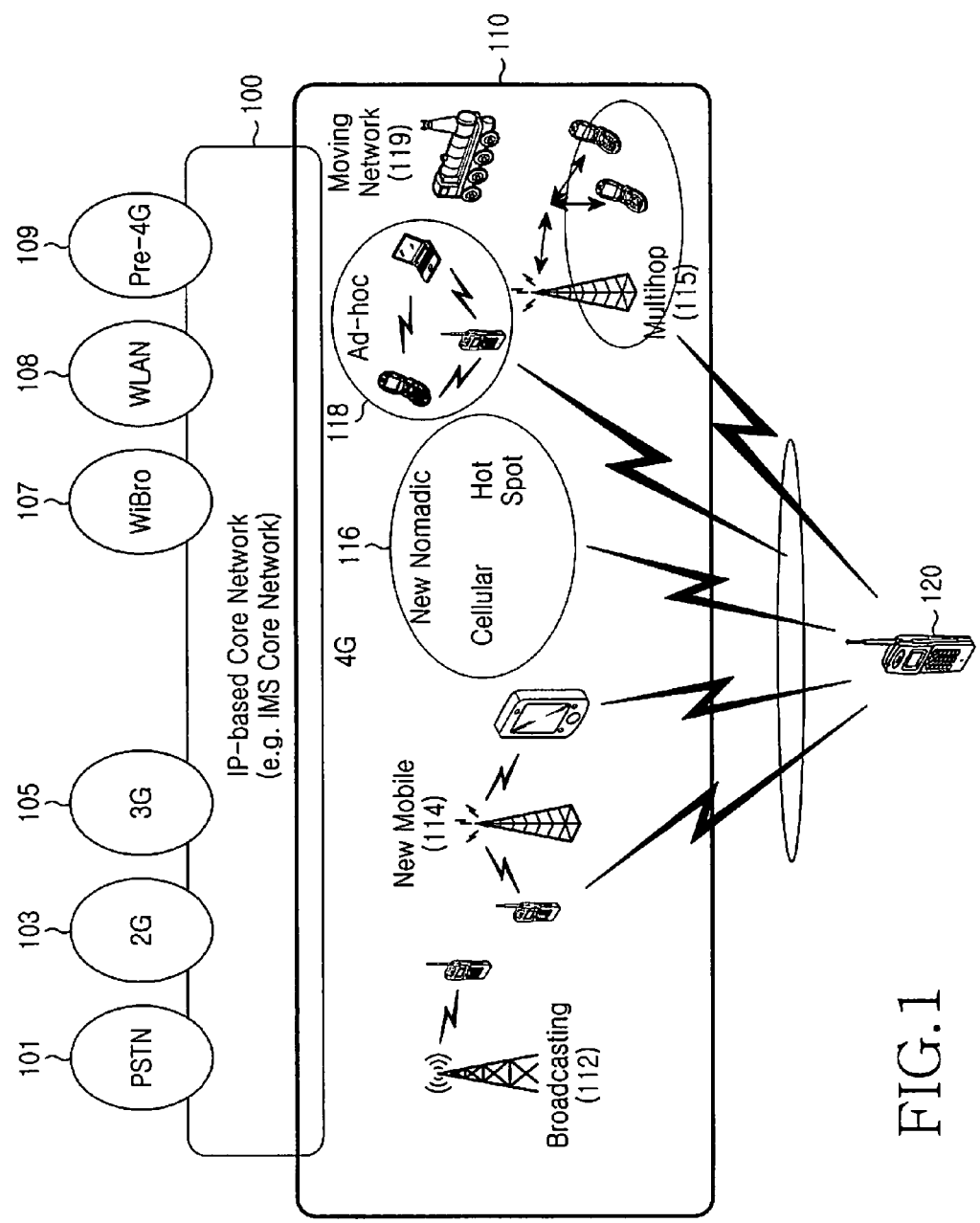
FIG. 1 illustrates a configuration of a communication system supporting multiple communication service modes according to the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for the sake of clarity and conciseness.

FIG. 1 illustrates a configuration of a communication system supporting multiple communication service modes according to the present invention.

Referring to FIG. 1, a core network 100 in the communication system supports multiple Internet Protocol (IP)-based communication service modes. The communication service modes can include Public Switched Telephone Network (PSTN) 101, $2^{nd}$ Generation (2G) 103, $3^{rd}$ Generation (3G) 105, Wireless Broadband Internet (WiBro) 107, Wireless Local Area Network (WLAN) 108 and Pre-$4^{th}$ Generation (Pre-4G) 109.

A user terminal 120 can enjoy the 4G service by means of various communication service modes supporting a 4G system 110.

The communication service modes provided in the 4G service can include Broadcasting service 112, new mobile communication mode (New Mobile) 114, New Nomadic 116 which is radio access technology (Hot Spot) of a low-rate mobile communication terminal, Multi-hop 115, Ad-hoc 118 and Moving Network 119.

The present invention herein is premised on the assumption that the single-RAT communication system supports multiple communication service modes optimized for various users' channel environments and also supports the specialized multiple Radio Access Technologies (RATs) of the communication service modes in the environment where various communication service modes are supported, like the 4G system of FIG. 1. In this case, each base station can service more than two communication service modes, and a combination of a base station and its associated communication service mode can be different for each base station.

The present invention provides a random access method for providing an optimal service to a user terminal in a single-RAT communication system supporting multiple communication service modes, such as the 4G system previously described. Specifically, the present invention designs a structure of a random access channel for the single-RAT communication system supporting the multiple communication service modes shown in FIG. 1, generates a random access message and manages a random access using the same.

Figure 2:
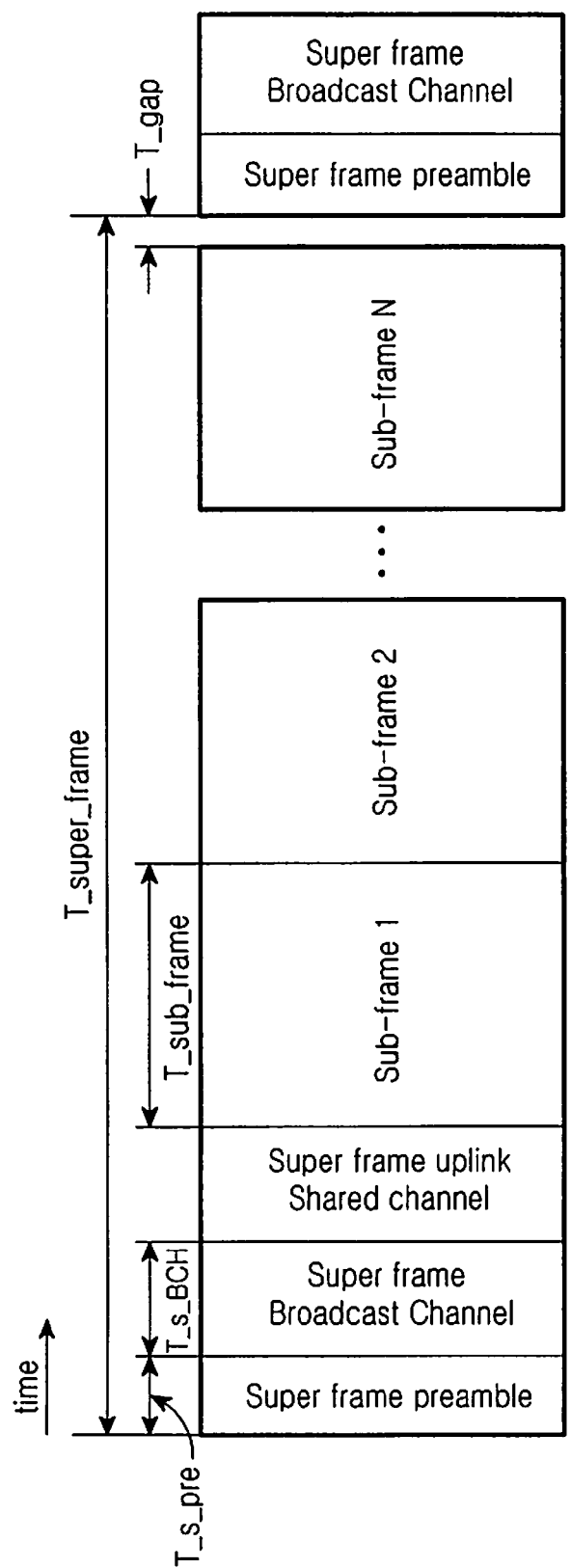
FIG. 2 illustrates an example of a frame structure according to the present invention.

FIG. 2 illustrates an example of a frame structure according to the present invention.

Referring to FIG. 2, a frame maps a necessary communication service mode in units of subframes, each of which is a time-frequency block, thereby providing the corresponding service. A selected number of the subframes constitute a superframe. As separate preamble, broadcast channel and uplink-shared channel are needed as a superframe unit, they are included as elements of the frame.

A particular superframe is composed of a combination of subframes for support of more than one communication service mode among the communication service modes supportable by a corresponding base station. That is, not all subframes for all communication service modes serviceable by the corresponding base station can be included in each superframe.

It is assumed herein that each user terminal can estimate a base station from which it can receive a service at the present time, can estimate information on a combination of communication service modes supportable by the base station, and can also estimate the optimal one of the possible combinations.

For a random access procedure for providing an optimal service to a user terminal, the present invention defines a random access message and provides a random access information transmission method as follows.

First, the present invention defines a random access message that the user terminal will send to the base station.

For example, in the $3.5^{th}$ generation system such as Institute of Electrical and Electronics Engineers (IEEE) 802.16e and IEEE 802.20, the random access message includes information on a target base station to which the user terminal makes an access attempt, and access and scheduling request information. The scheduling request information may include, e.g., a data rate request. In the single-RAT communication system supporting multiple communication service modes, to make a random access, the user terminal sends to the base station its preferred communication service mode (mandatory) and its available communication service mode (optional).

Next, the user terminal transmits the random access information to the corresponding base station using a synchronous or an asynchronous random access scheme. In the synchronous random access scheme, the user terminal transmits the random access information to the base station at a time. In the asynchronous random access scheme, the user terminal primarily transmits an access sequence to the base station to inform that it makes an access attempt to a particular base station. Thereafter, the user terminal is allocated a channel over which it can transmit the scheduling request information, and then sends a scheduling request message over the allocated channel.

Finally, a random access channel for transmission/reception of the random access information is generated according to the following three different embodiments.

Figure 3:
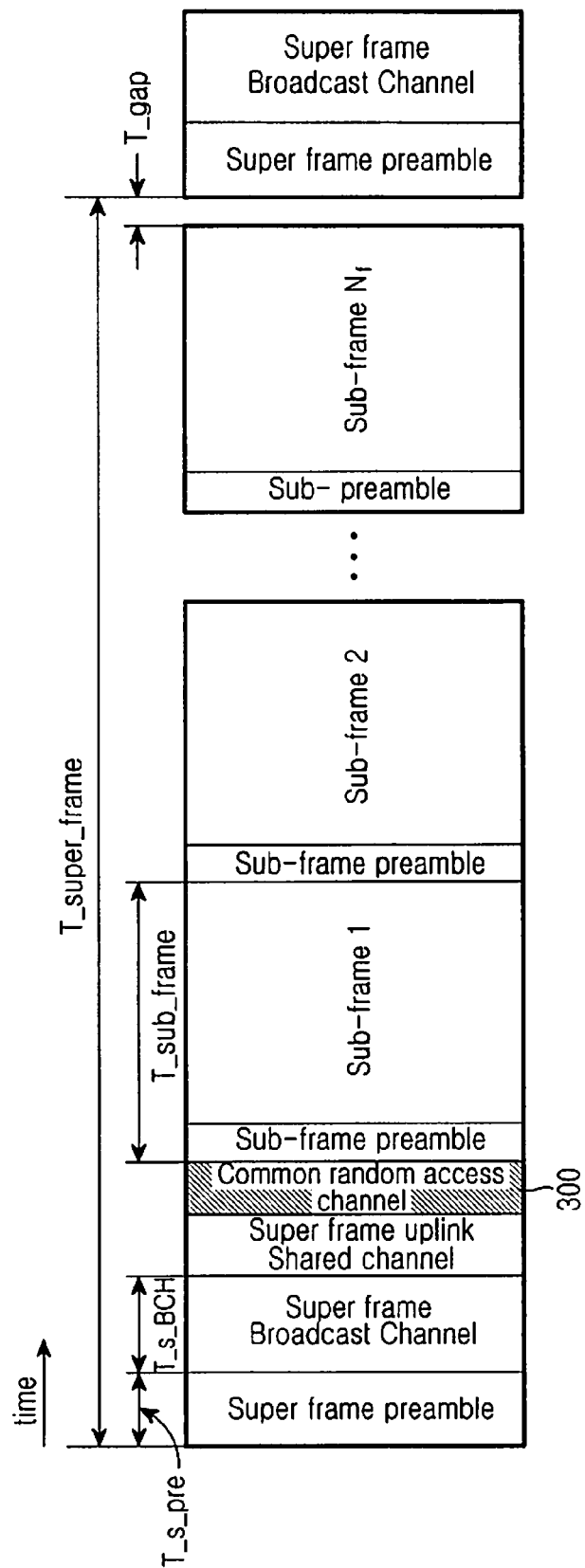
FIG. 3 illustrates a structure of a random access channel according to a first embodiment of the present invention.

FIG. 3 illustrates a structure of a random access channel according to a first embodiment of the present invention.

Referring to FIG. 3, there is only a common random access channel 300 that is available regardless of the type of the communication service mode provided by a base station.

A system parameter, data rate and a coding rate are determined taking into account all channel conditions including parameters such as Signal-to-Noise Ratio (SNR) and channel selectivity, of all communication service modes serviced by the corresponding base station. Therefore, the random access procedure performed using the common random access channel (or shared channel) 300 can be very low in the processing complexity. However, it is not possible to provide the channel condition in which the base station supports only the optimal communication service mode to the corresponding user terminal, causing a decrease in the efficiency.

Figure 4:
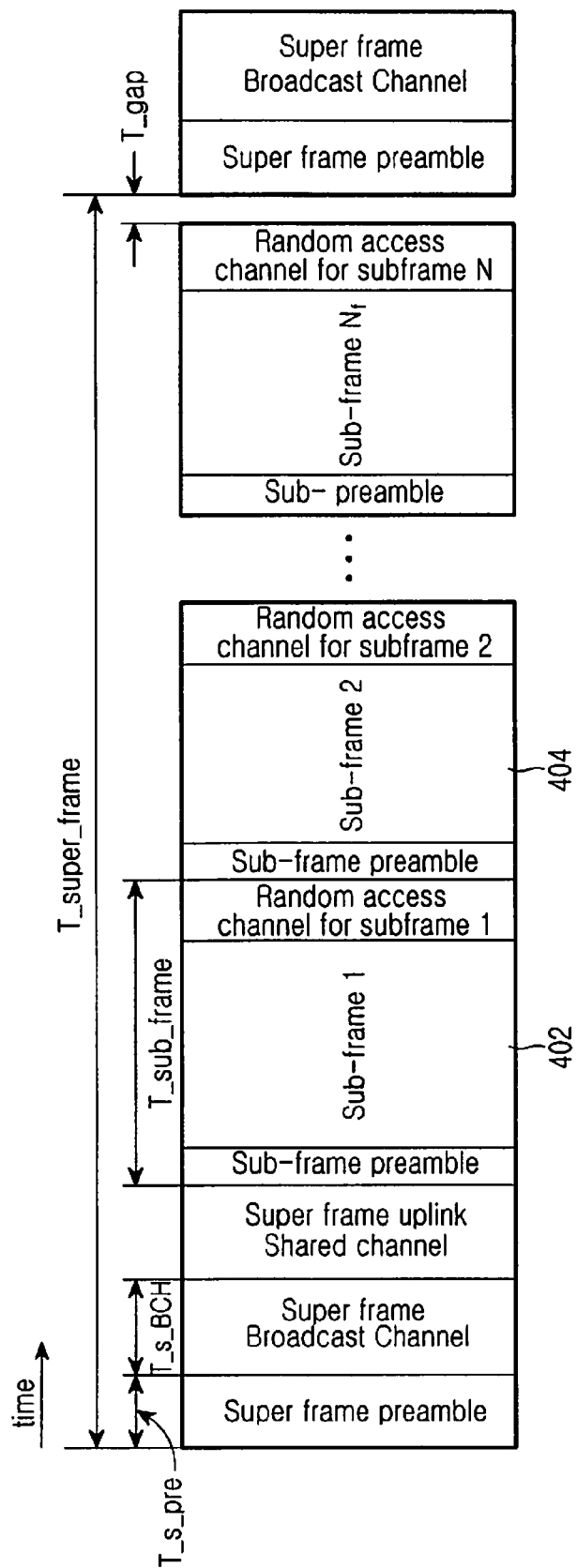
FIG. 4 illustrates a structure of a random access channel according to a second embodiment of the present invention.

FIG. 4 illustrates a structure of a random access channel according to a second embodiment of the present invention.

Referring to FIG. 4, there are random access channels 402 and 404 designed to be suitable for a corresponding communication service mode parameter mapped individually to each subframe. In this case, the random access channels 402 and 404 each are designed with a parameter, a data rate and a coding rate, all of which are optimized for the corresponding communication service mode. Therefore, if the communication service mode optimal for the user terminal is scheduled in the corresponding superframe, its efficiency is optimized. However, if the communication service mode optimal for the user terminal is not scheduled in the corresponding superframe, the user terminal should wait until the subframe to which the optimal communication service mode is mapped is scheduled, causing a possible latency.

Figure 5:
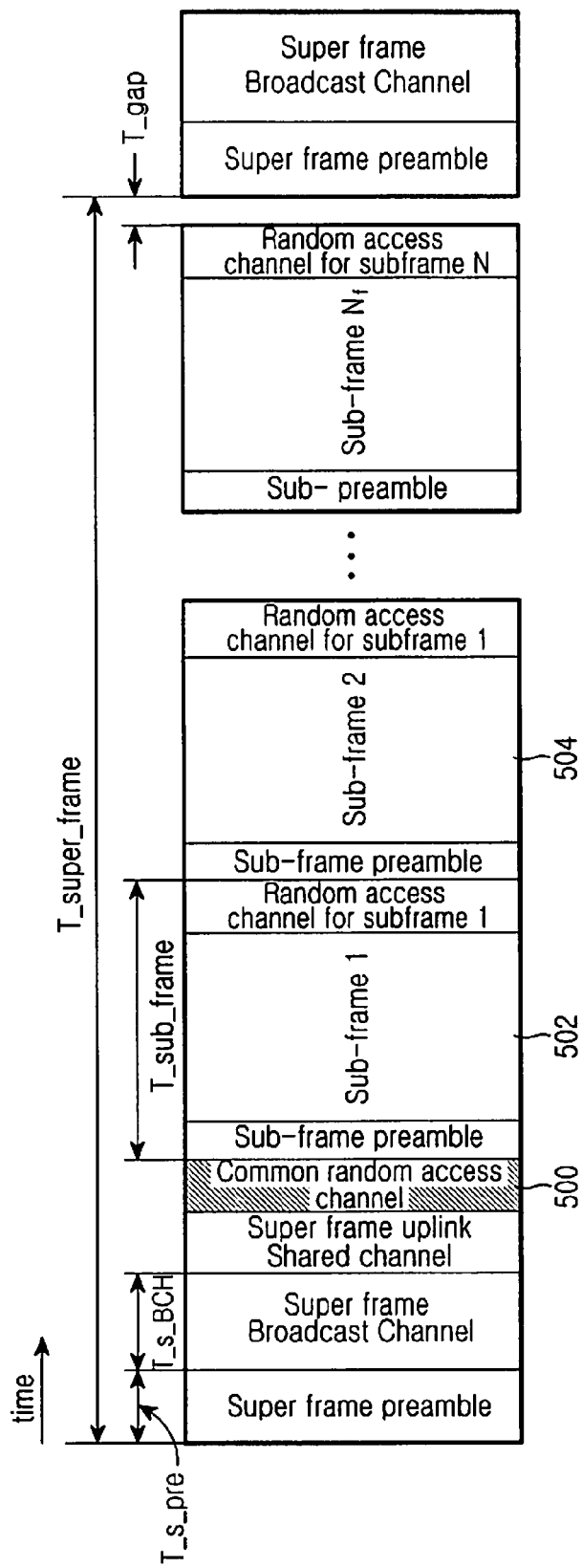
FIG. 5 illustrates a structure of a random access channel according to a third embodiment of the present invention.

FIG. 5 illustrates a structure of a random access channel according to a third embodiment of the present invention.

Referring to FIG. 5, there is a common random access channel 500 available regardless of the type of the communication service mode supported by the base station. Also, there are all dedicated random access channels 502 and 504 individually for each subframe to which each of the communication service modes supported by the base station is mapped.

In this case, if the dedicated random access channels include a random access channel corresponding to the communication service mode providing the optimal service to the corresponding user terminal, the user terminal attempts an access to the corresponding random access channel. However, if the communication service mode providing the optimal service to the user terminal is not scheduled in the corresponding superframe, the user terminal attempts an access using the common random access channel. Here, a ratio of communication service modes scheduled in the superframe is subject to change according to a ratio of communication service modes to which an access attempt is made.

Figure 6:
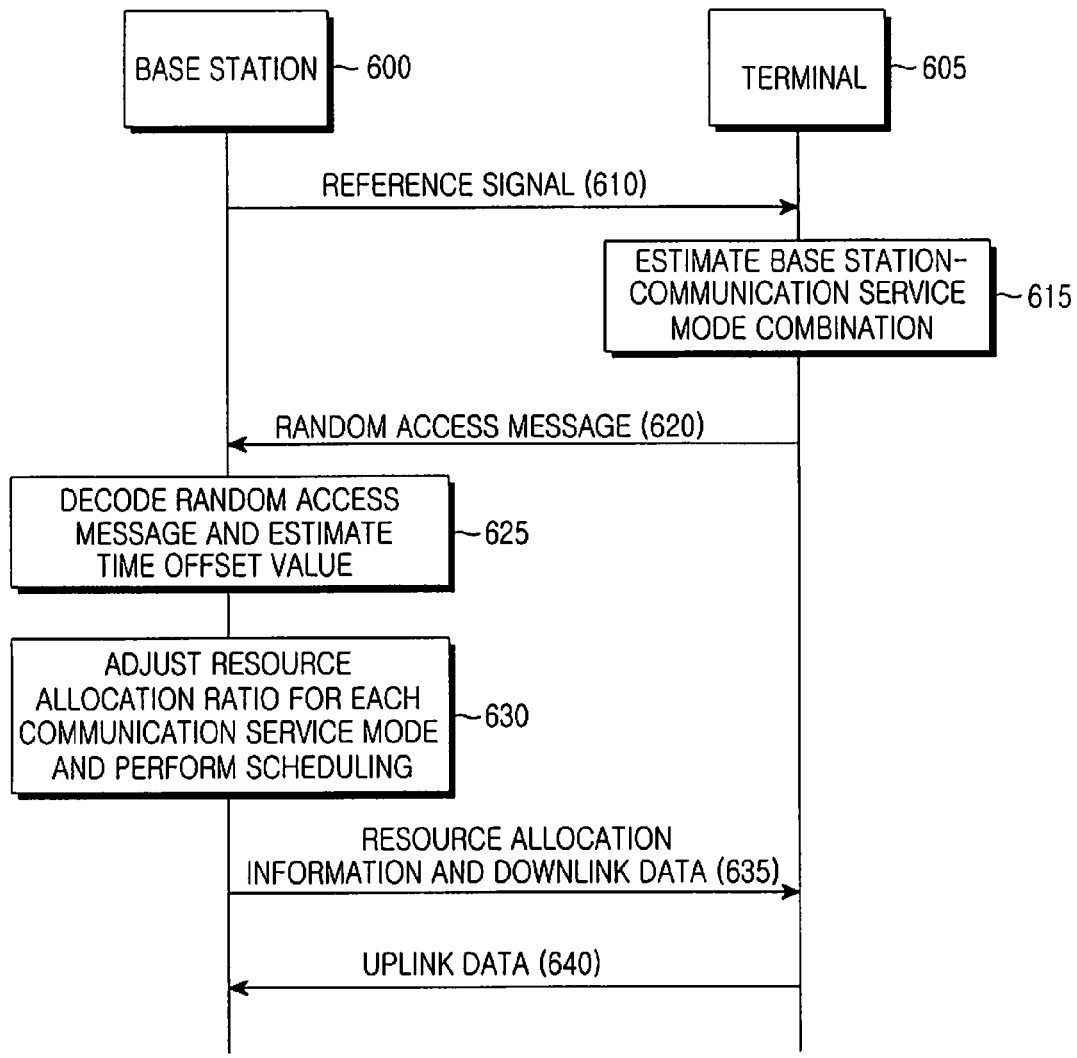
FIG. 6 illustrates a synchronous random access procedure according to the first embodiment of the present invention.

FIG. 6 illustrates a synchronous random access procedure according to the first embodiment of the present invention. The synchronous random access procedure is performed between a base station 600 supporting multiple communication service modes, and a terminal 605 for receiving an optimal service among the multiple communication service modes.

Referring to FIG. 6, in step 610, the base station 600 transmits a reference signal, or its own identifier, to the terminal 605. In step 615, the terminal 605 estimates a 'base station—communication service mode combination', or a combination between a base station and a communication service mode supporting an optimal service among the communication service modes provided by neighboring base stations including the base station 600.

In step 620, the terminal 605 sends a random access message to the base station 600 over a shared channel. The random access message includes an access sequence transmitted at every random access request, information on a communication service mode (mandatory) preferred by the terminal 605 and information on the available communication service modes.

In step 625, the base station 600 decodes the received random access message, and estimates a time offset value. In step 630, the base station 600 adjusts a resource allocation ratio for each individual communication service mode according to the random access messages received from the terminals, and schedules uplink/downlink channels to the terminals. In step 635, the base station 600 transmits resource allocation information including the estimated time offset, and downlink data to the terminal 605.

In step 640, the terminal 605 transmits uplink data to the base station 600 according to the time offset.

Figure 7:
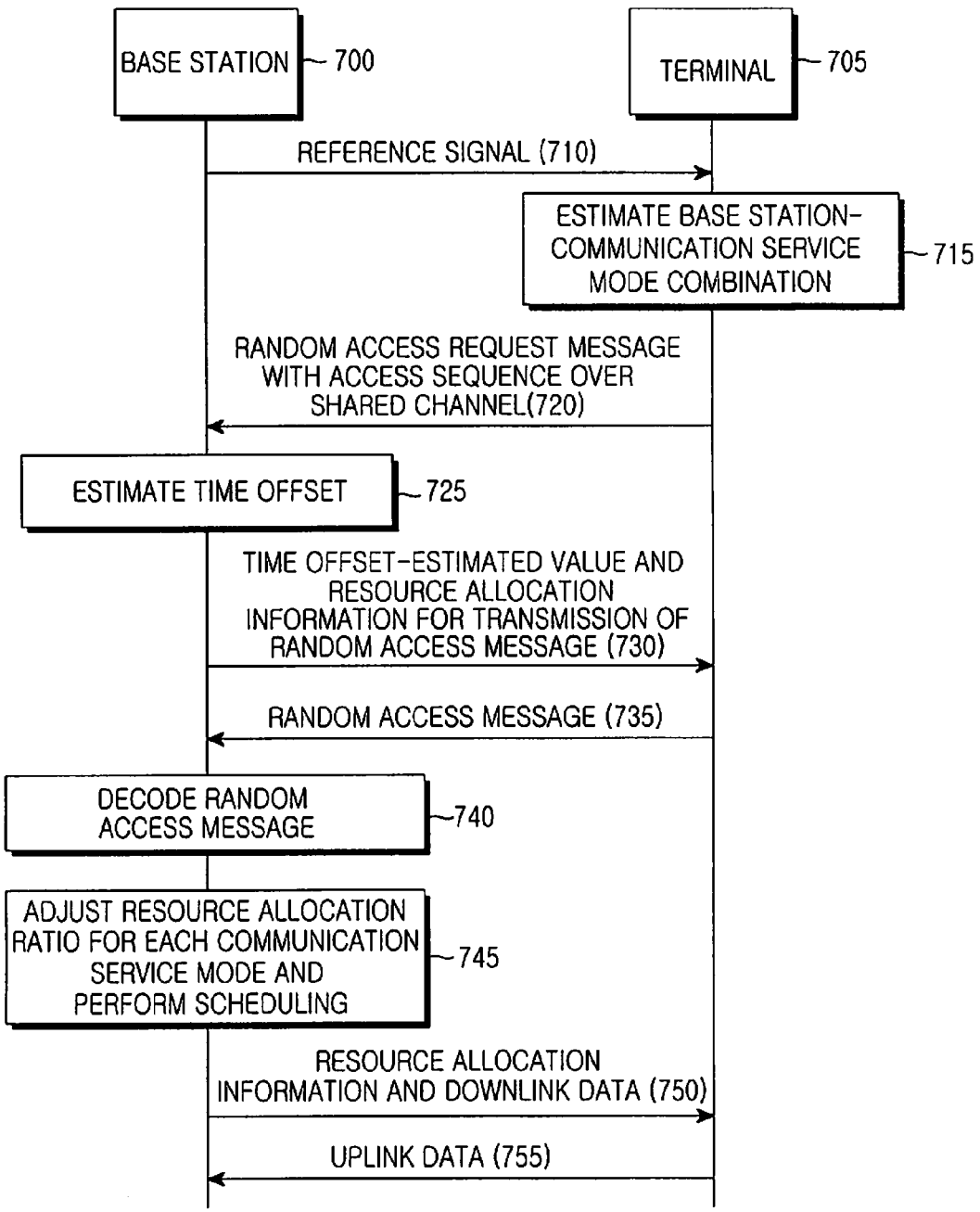
FIG. 7 illustrates an asynchronous random access procedure according to the first embodiment of the present invention.

FIG. 7 illustrates an asynchronous random access procedure according to the first embodiment of the present invention. Similarly, the asynchronous random access procedure is performed between a base station 700 supporting multiple communication service modes, and a terminal 705 for receiving an optimal service among the multiple communication service modes.

Referring to FIG. 7, in step 710, the base station 700 transmits a reference signal, or its own identifier, to the terminal 705. In step 715, the terminal 705 estimates a 'base station—communication service mode combination' providing the optimal service among the communication service modes provided by neighboring base stations including the base station 700.

In step 720, the terminal 705 sends a random access request message to the base station 700 over a shared channel. The random access request message includes an access sequence mapped to the estimated communication service mode.

In step 725, the base station 700 estimates a time offset based on the access sequence, and schedules an uplink channel for transmission of a random access message. In step 730, the base station 700 transmits uplink channel allocation information for transmission of the random access message, and the time offset-estimated value, to the terminal 705 over the shared channel.

In step 735, the terminal 705 sends a random access message to the base station 700 over an uplink shared channel according to the time offset. The random access message includes information on a communication service mode (which is mandatory) preferred by the terminal 705, and information on the available communication service modes. The uplink shared channel is scheduled in each access sequence mapped individually to each communication service mode supported by the base station 700.

In step 740, the base station 700 decodes the random access message, and estimates a time offset value. In step 745, the base station 700 adjusts a resource allocation ratio for each individual communication service mode according to the random access messages received from the detected terminals, and schedules uplink/downlink channels to the terminals. In step 750, the base station 700 transmits resource allocation information and downlink data to the terminal 705.

In step 755, the terminal 705 transmits uplink data to the base station 700 according to the scheduling result.

Figure 8:
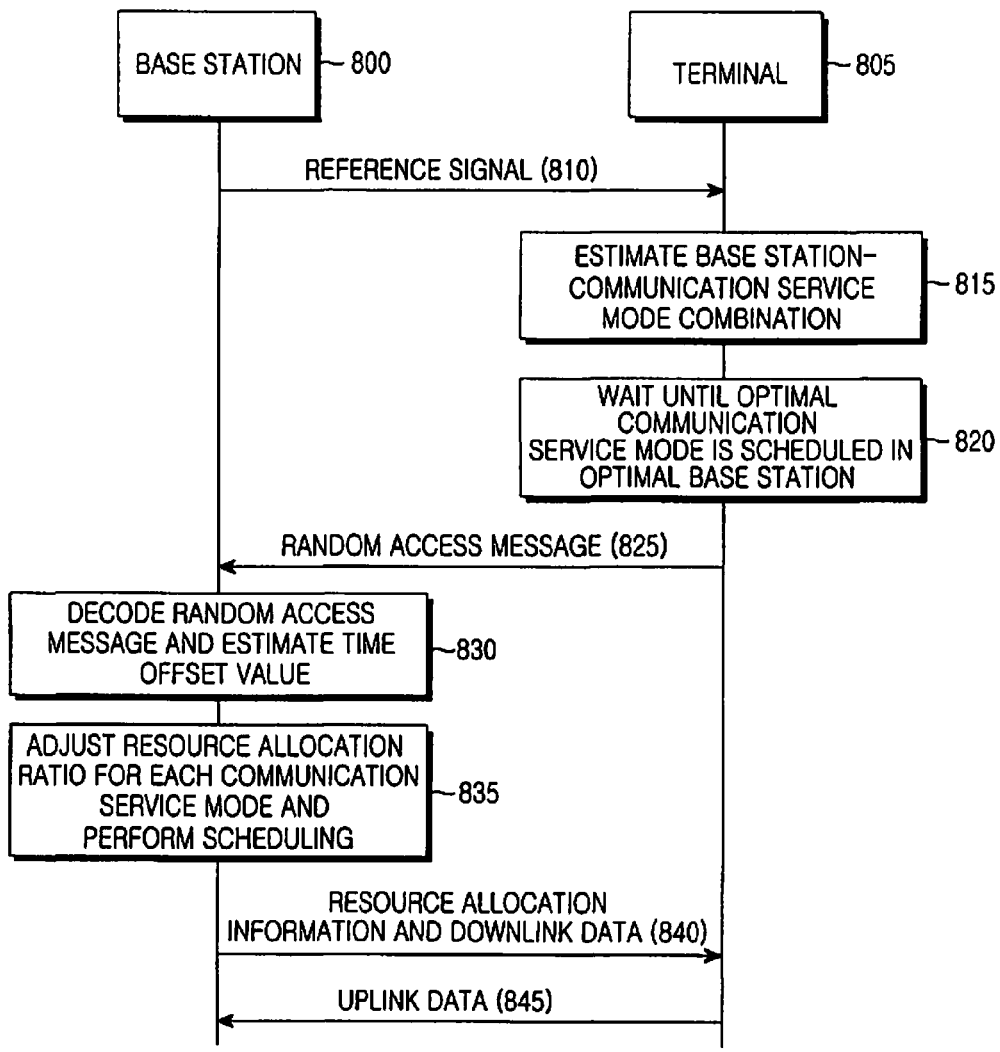
FIG. 8 illustrates a synchronous random access procedure according to the second embodiment of the present invention.

FIG. 8 illustrates a synchronous random access procedure according to the second embodiment of the present invention. Similarly, the synchronous random access procedure is performed between a base station 800 supporting multiple communication service modes, and a terminal 805 for receiving an optimal service among the multiple communication service modes.

Referring to FIG. 8, in step 810, the base station 800 transmits a reference signal, or its own identifier, to the terminal 805. In step 815, the terminal 805 estimates a 'base station—communication service mode combination' providing an optimal service among the communication service modes provided by neighboring base stations including the base station 800.

In step 820, the terminal 805 waits until an allocated dedicated channel associated with an optimal communication service mode is scheduled in the estimated optimal base station.

If the dedicated channel for the optimal scenario is scheduled, the terminal 805 sends, in step 825, a random access message to the base station 800 over the scheduled dedicated channel. The random access message includes an access sequence transmitted at every random access request, information on a communication service mode (which is mandatory) preferred by the terminal 805, and information on the available communication service modes.

In step 830, the base station 800 decodes the received random access message, and estimates a time offset value. In step 835, the base station 800 adjusts a resource allocation ratio for each individual communication service mode according to the random access messages received from the terminals, and schedules uplink/downlink channels to the terminals. In step 840, the base station 800 transmits, to the terminal 805, uplink/downlink resource allocation information including the estimated time offset, and downlink data.

In step 845, the terminal 805 transmits uplink data to the base station 800 according to the time offset.

Figure 9:
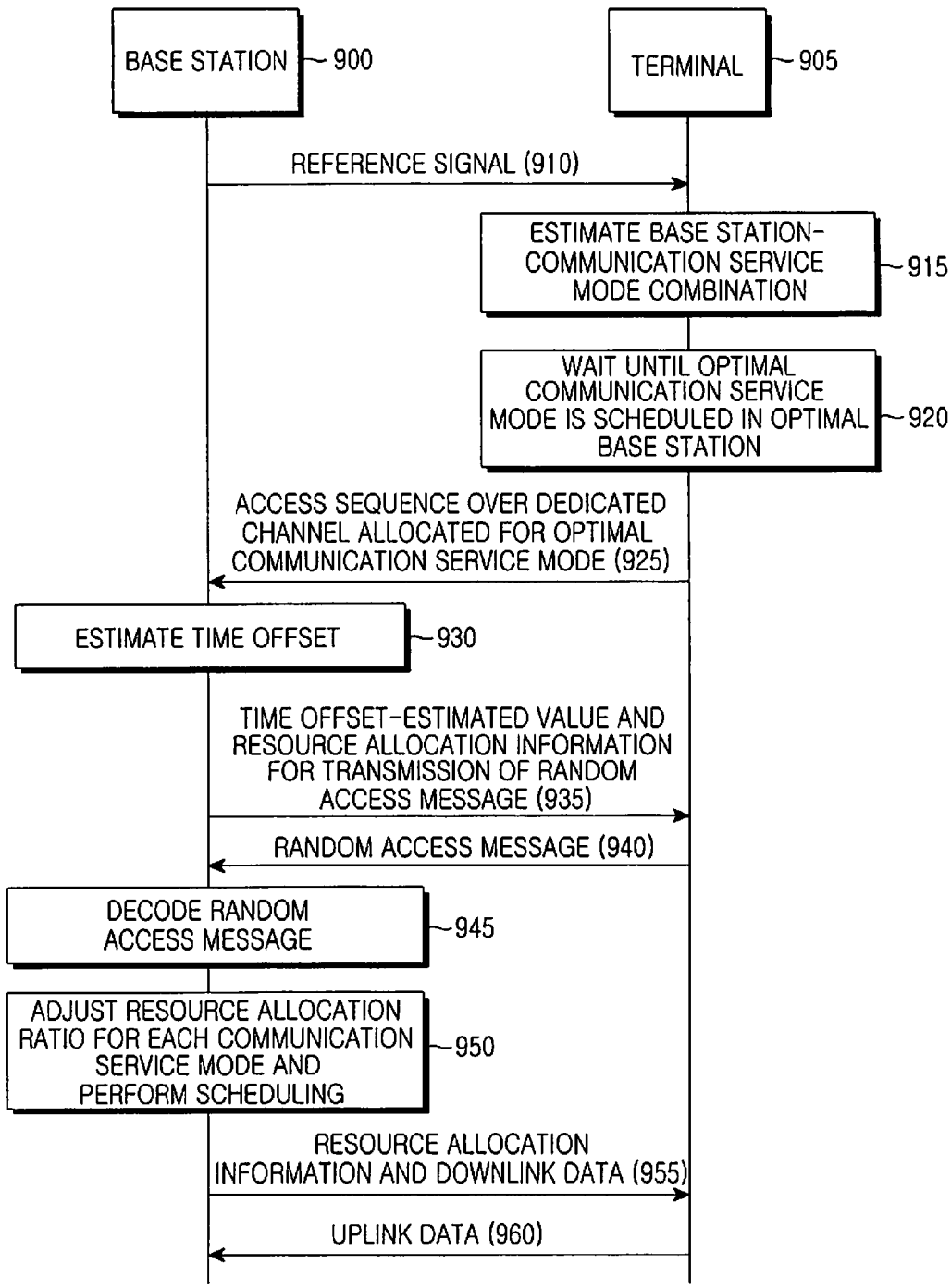
FIG. 9 illustrates an asynchronous random access procedure according to the second embodiment of the present invention.

FIG. 9 illustrates an asynchronous random access procedure according to the second embodiment of the present invention. Similarly, the asynchronous random access procedure is performed between a base station 900 supporting multiple communication service modes, and a terminal 905 for receiving an optimal service among the multiple communication service modes.

Referring to FIG. 9, in step 910, the base station 900 transmits a reference signal, or its own identifier, to the terminal 905. In step 915, the terminal 905 estimates a 'base station—communication service mode combination' providing an optimal service among the communication service modes provided by neighboring base stations including the base station 900.

In step 920, the terminal 905 waits until an allocated dedicated channel associated with an optimal communication service mode is scheduled in the estimated optimal base station.

If the dedicated channel associated with the optimal communication service mode is scheduled, the terminal 905 sends, in step 925, a random access request message to the base station 900 over the allocated dedicated channel. The random access request message includes an access sequence mapped to the estimated communication service mode.

In step 930, the base station 900 estimates a time offset according to the access sequence, and schedules an uplink channel for transmission of a random access message. In step 935, the base station 900 transmits, to the terminal 905, the time offset-estimated value and uplink channel allocation information for transmission of a random access message.

In step 940, the terminal 905 sends a random access message to the base station 900 over the allocated uplink channel according to the time offset. The random access message includes information on a communication service mode (which is mandatory) preferred by the terminal 905, and information on the available communication service modes. The uplink channel is scheduled in each access sequence mapped individually to each communication service mode supported by the base station 900.

In step 945, the base station 900 decodes the random access message. In step 950, the base station 900 adjusts a resource allocation ratio for each individual communication service mode, and schedules uplink/downlink channels to each user. In step 955, the base station 900 transmits resource allocation information and downlink data to the terminal 905 according to the scheduling result.

In step 960, the terminal 905 transmits uplink data to the base station 900 according to the scheduling result.

Figure 10:
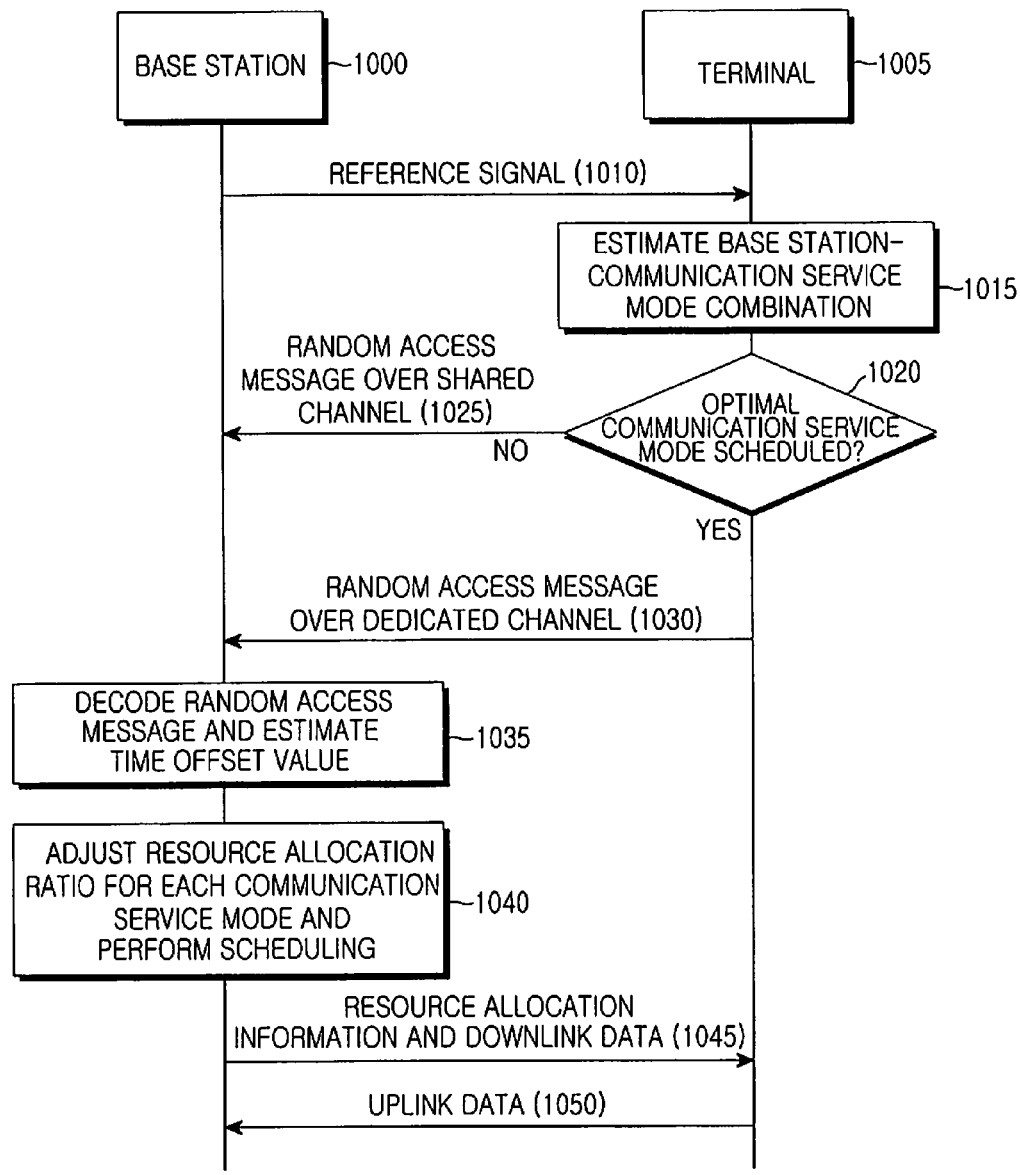
FIG. 10 illustrates a synchronous random access procedure according to the third embodiment of the present invention.

FIG. 10 illustrates a synchronous random access procedure according to the third embodiment of the present invention. Similarly, the synchronous random access procedure is performed between a base station 1000 supporting multiple communication service modes, and a terminal 1005 for receiving an optimal service among the multiple communication service modes.

Referring to FIG. 10, in step 1010, the base station 1000 transmits a reference signal, or its own identifier, to the terminal 1005. In step 1015, the terminal 1005 estimates a 'base station—communication service mode combination' providing an optimal service among the communication service modes provided by neighboring base stations including the base station 1000.

In step 1020, the terminal 1005 determines whether a dedicated channel allocated for an optimal communication service mode is scheduled in the estimated optimal base station. If it is determined that no dedicated channel is scheduled, the base station 1000 sends a random access message to the base station 1000 over the scheduling shared channel in step 1025. If it is determined that a dedicated channel is scheduled, the terminal 1005 sends a random access message to the base station 1000 over the scheduled dedicated channel in step 1030. The random access message includes an access sequence transmitted at every random access request, information on a communication service mode (mandatory) preferred by the terminal 1005, and information on the available communication service modes.

In step 1035, the base station 1000 decodes the received random access message, and estimates a time offset value. In step 1040, the base station 1000 adjusts a resource allocation ratio for each individual communication service mode according to random access messages received from terminals, and schedules uplink/downlink channels to the terminals. In step 1045, the base station 1000 transmits uplink/downlink resource allocation information including the estimated time offset, and downlink data to the terminal 1005.

In step 1050, the terminal 1005 transmits uplink data to the base station 1000 according to the time offset.

Figure 11:
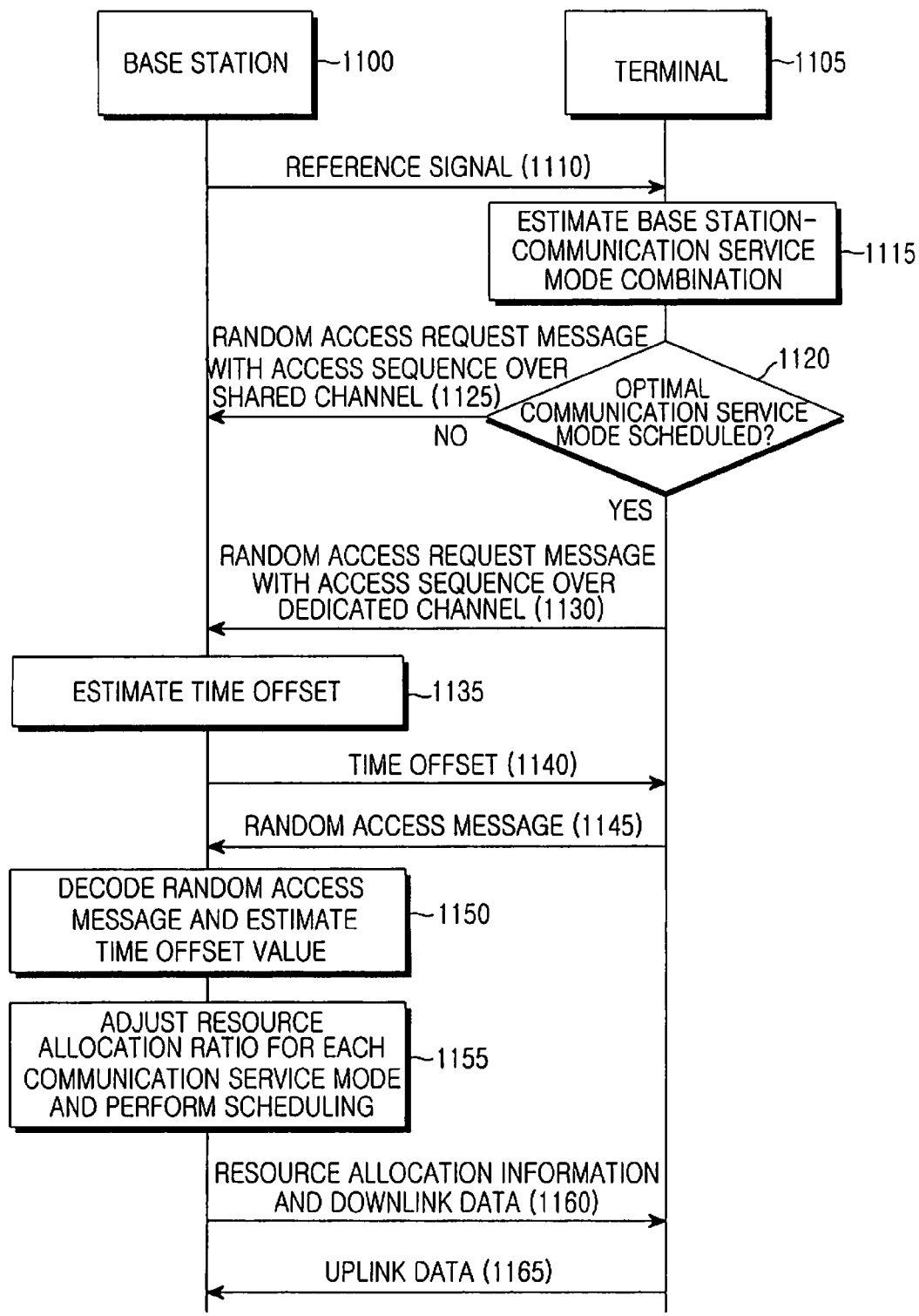
FIG. 11 illustrates an asynchronous random access procedure according to the third embodiment of the present invention.

FIG. 11 illustrates an asynchronous random access procedure according to the third embodiment of the present invention. Similarly, the asynchronous random access procedure is performed between a base station 1100 supporting multiple communication service modes, and a terminal 1105 for receiving an optimal service among the multiple communication service modes.

Referring to FIG. 11, in step 1110, the base station 1100 transmits a reference signal, or its own identifier, to the terminal 1105. In step 1115, the terminal 1105 estimates a 'base station—communication service mode combination' providing an optimal service among the communication service modes provided by neighboring base stations including the base station 1100.

In step 1120, the terminal 1105 determines whether a dedicated channel allocated for an optimal communication service mode is scheduled in the estimated optimal base station. If it is determined that no dedicated channel is scheduled, the base station 1100 transmits an access sequence and a random access request message to the base station 1100 over the scheduled shared channel in step 1125. However, if it is determined that a dedicated channel is scheduled, the terminal 1105 transmits the access sequence and the random access request message to the base station 1100 over the scheduled dedicated channel in step 1130. In step 1135, the base station 1100 estimates a time offset based on the access sequence, and schedules an uplink channel for transmission of the random access message. In step 1140, the base station 1100 transmits the time offset-estimated value and the uplink channel allocation information for transmission of the random access message to the terminal 1105.

In step 1145, the terminal 1105 sends a random access message over the allocated uplink channel according to the time offset. The random access message includes information on a communication service mode (which is mandatory) preferred by the terminal 1105, and information on the available communication service modes.

In step 1150, the base station 1100 decodes the received random access message. In step 1155, the base station 1100 adjusts a resource allocation ratio for each individual communication service mode according to the random access messages received from the terminals, and schedules uplink/downlink channels to the terminal. In step 1160, the base station 1000 transmits uplink/downlink resource allocation information and downlink data to the terminal 1005.

In step 1165, the terminal 1105 transmits uplink data to the base station 1100 according to the scheduling result.

As is apparent from the foregoing description, according to the present invention, the single-RAT communication system supporting multiple communication service modes can provide an optimal service to the corresponding terminal over the common random access channel and the random access channel allocated individually for each communication service mode.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting and receiving data by a user terminal in a communication system, the method comprising the steps of:
   receiving, from a base station supporting a plurality of communication services, an identifier of the base station;
   determining whether a dedicated random access channel of a communication service preferred by the user terminal, from among individually dedicated random access channels for each subframe to which each of the communication services is mapped, is scheduled;
   if the dedicated random access channel is scheduled, transmitting, to the base station, a random access message over the dedicated random access channel;
   if the dedicated random access channel is not scheduled, transmitting the random access message over a shared random access channel available regardless of a type of communication service provided by the base station; and
   receiving, from the base station, resource allocation information for a resource allocated to the user terminal based on the random access message;
   wherein the random access message includes the communication service preferred by the user terminal.

2. The method of claim 1, wherein the random access message includes an access sequence mapped to each of the communication services and information for available communication services of the user terminal.

3. The method of claim 1, wherein the resource allocation information comprises the resource allocation information for the resource allocated to the user terminal and a time offset, allocated according to a resource allocation ratio corresponding to each of the communication service preferred by the user terminal and the available communication services.

4. The method of claim 3, further comprising transmitting uplink data to the base station according to the time offset.

5. A method for transmitting and receiving data by a base station in a communication system, the method comprising the steps of:
   transmitting a reference signal indicative of an identifier of the base station, which supports a plurality of communication services, to a user terminal;
   if a dedicated random access channel is scheduled to the user terminal, receiving a random access message over the dedicated random access channel from the user terminal, the dedicated random access channel is mapped to a communication service preferred by the user terminal among individually dedicated random access channels for each subframe to which each of the communication services is mapped;
   if a dedicated random access channel is not scheduled, receiving the random access message over a shared random access channel available regardless of a type of communication service provided by the base station; and
   scheduling an uplink/downlink channel to the user terminal according to a resource allocation ratio corresponding to each of the communication service preferred by the user terminal and available communication services;
   wherein the random access message includes the communication service preferred by the user terminal.

6. The method of claim 5, further comprising:
estimating a time offset value based on an access sequence achieved from the random access message; and
transmitting resource allocation information including the estimated time offset value and downlink data to the user terminal;
wherein the access sequence is mapped to the communication service preferred by the user terminal.

7. The method of claim 6, wherein the random access message further comprises information for the available communication services of the user terminal.

8. The method of claim 5, further comprising:
adjusting the resource allocation ratio corresponding to each of the communication service preferred by the user terminal and the available communication services; and
scheduling the uplink/downlink channel to the user terminal.

9. A user terminal for transmitting and receiving data in a communication system, wherein:
the user terminal receives an identifier of a base station from the base station supporting a plurality of communication services, determines whether a dedicated random access channel of a communication service preferred by the user terminal is scheduled from among individually dedicated random access channels for each subframe to which each of the communication services is mapped, transmits a random access message to the base station over the dedicated random access channel if the dedicated random access channel is scheduled, transmits the random access message over a shared random access channel available regardless of a type of communication service provided by the base station if the dedicated random access channel is not scheduled, and receives, from the base station, resource allocation information for a resource allocated to the user terminal based on the random access message; and
the random access message includes the communication service preferred by the user terminal.

10. The user terminal of claim 9, wherein the random access message includes an access sequence mapped to each of the communication service and information for available communication services of the user terminal.

11. The user terminal of claim 9, wherein the resource allocation information includes the resource allocation information for the resource allocated to the user terminal and a time offset, allocated according to a resource allocation ratio corresponding to each of the communication service preferred by the user terminal and the available communication services.

12. The user terminal of claim 11, wherein the user terminal transmits uplink data according to the time offset to the base station.

13. A base station for transmitting and receiving data in a communication system, wherein:
the base station supporting a plurality of communication services transmits a reference signal indicative of an identifier of the base station to a user terminal, receives a random access message over a dedicated random access channel from the user terminal if the dedicated random access channel is scheduled to the user terminal, the dedicated random access channel is mapped to a communication service preferred by the user terminal from among individually dedicated random access channels for each subframe to which each of the communication services is mapped, receives the random access message over a shared random access channel available regardless of a type of communication service provided by the base station if a dedicated random access channel is not scheduled, and schedules an uplink/downlink channel to the user terminal according to a resource allocation ratio corresponding to each of the communication service preferred by the user terminal and available communication services;
wherein the random access message includes the communication service preferred by the user terminal.

14. The base station of claim 13, wherein:
the base station estimates a time offset value based on an access sequence determined from the random access message, and transmits resource allocation information including the estimated time offset value and downlink data to the user terminal; and
the access sequence is mapped to the communication service preferred by the user terminal.

15. The base station of claim 14, wherein the random access message further comprises information for the available communication services of the user terminal.

16. The base station of claim 13, wherein:
the base station adjusts the resource allocation ratio corresponding to each of the communication service preferred by the user terminal and the available communication services, and schedules the uplink/downlink channel to the user terminal.

* * * * *